May 6, 1924.
C. L. HOWARD
1,492,848
GREASE CUP PLUG AND METHOD OF PREVENTING ITS RETROGRADE MOVEMENT
Filed Jan. 18, 1923
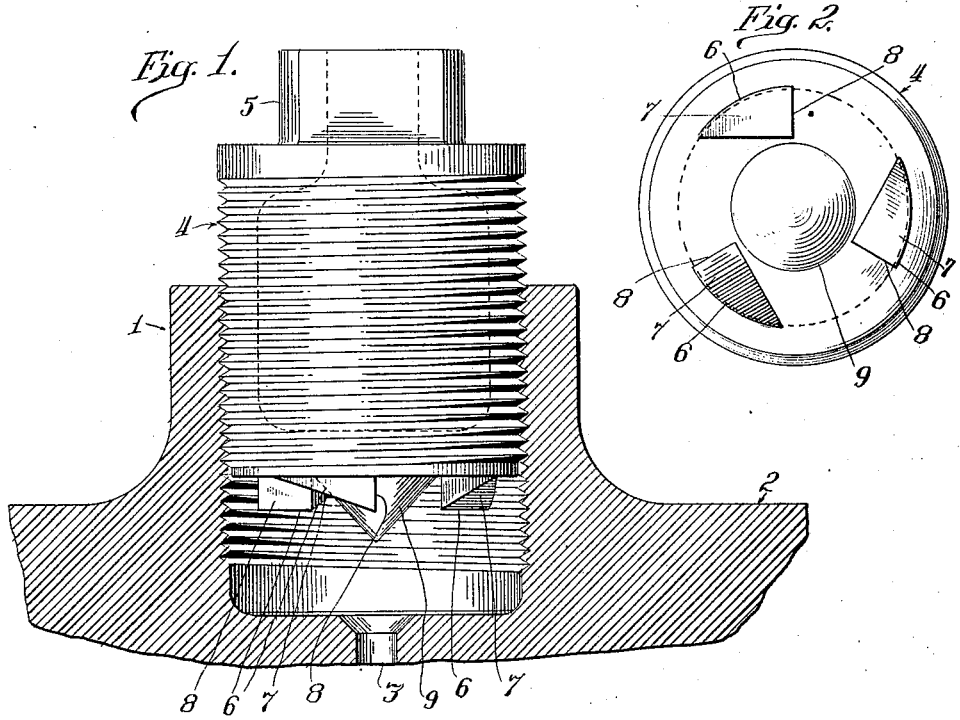
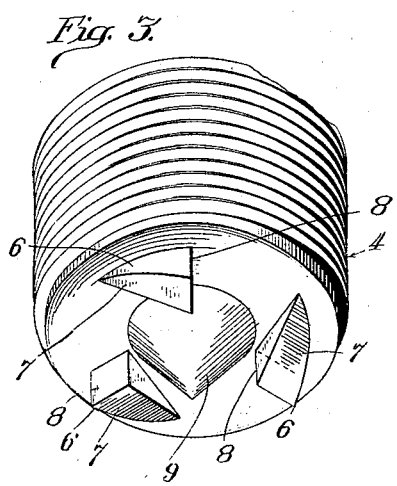
Inventor
Charles L. Howard
Witness
Milton Lenoir Patented May 6, 1924.

1,492,848

UNITED STATES PATENT OFFICE.

CHARLES L. HOWARD, OF CHICAGO, ILLINOIS.

GREASE-CUP PLUG AND METHOD OF PREVENTING ITS RETROGRADE MOVEMENT.

Application filed January 18, 1923. Serial No. 613,524.

*To all whom it may concern:*

Be it known that I, CHARLES L. HOWARD, a citizen of the United States, residing at Chicago, in the county of Cook and State of Illinois, have invented certain new and useful Improvements in Grease-Cup Plugs and Methods of Preventing Their Retrograde Movement, of which the following is a specification.

This invention relates to improvements in grease cup feed plugs or plungers and the method of preventing their retrograde movement, and the object of the invention is to provide a one-piece device without special securing means, such as nutlocks, springs, etc., which shall be prevented from unscrewing or backing away from the grease, such retrograde movement having occured heretofore owing to expansion of the grease and to jar and shock imparted to the cup when used in connection with locomotive rods, cranks, eccentrics, or other machine elements subjected to vibration. The loss of grease cup plugs is not only an expensive item in itself but damage done to bearings owing to entrance into the cup of sand, grit, etc., when the plug is removed is something to be avoided, and, moreover, it is obvious that when the plug backs away from the grease and ceases to press thereon the lubricating action is minimized or fails completely, and the main feature of my invention is to remedy such defect by the means and method herein shown and described.

In the drawings,

Figure 1 is a vertical view of my improved plug in its preferred form shown with a cup integral with a side rod of a locomotive, the cup being shown in section; Fig. 2 is a bottom view of the plug shown in Fig. 1, and Fig. 3 is a perspective view of the same.

Referring to Fig. 1, 1 is an internally threaded grease cup preferably shown as made integral with a locomotive side rod 2, the cup having an outlet 3. The hollow plug 4, in threaded engagement with the cup, has a neck portion 5 for the use of an instrument for screwing and unscrewing the plug. As seen in Figs. 1, 2 and 3, the plug has upon its bottom a tooth or teeth 6 each having a forwardly extended inclined portion 7 and a shoulder 8. Upon the bottom of the plug 4 and preferably centrally within the circumferential area of the teeth is a substantially pointed projection 9, shown in the figures as an inverted cone.

The method and the means for carrying out the method are as follows:—The cup 1 having been supplied with the required amount of grease, the plug 4 is inserted and screwed down far enough to exert pressure thereon, the forwardly extended inclined portion 7 easing into the grease. In exerting this pressure under the downward movement of the plug the grease, by means of the projection or spreader 9, is displaced and forced between the teeth 6 within their line of travel and against the shoulders 8, and it will be seen that the co-operative action of the grease with the faces 8 will thus prevent accidental retrograde movement of the plug and its dislodgment from the grease and the cup. In other words the grease, being forced and compressed between the teeth 6 by the projection or spreader 9, causes an obstruction for each face 8 and it is these compressed obstructions against the faces of the teeth that prevent the accidental retrograde movement of the plug. It is obvious that if no teeth and projection were used on the bottom of the plug there would be no co-operation of the grease to hold the plug. Also, the compression of the grease is lacking to a marked degree if simply teeth alone are used but by the combined employment of teeth and a projection or spreader, the co-operation of the actually forced and compressed grease to hold the plug is at once apparent.

Throughout the specification and claims I have used the words "tooth" and "teeth", but it is to be understood that these words are not intended to limit the invention to teeth, strictly speaking. I have used these words in a broad sense to cover any element or formation having a shoulder or the like against which grease may be forced by means of a projection or spreader situated upon the bottom of the plug. In practical use upon locomotive rods of one of the western trunk lines three teeth, as shown in Figs. 1, 2 and 3, have proved satisfactory, but I do not restrict myself to that number. Under certain conditions the use of only one tooth or more than three teeth with the projection may be advisable.

While I have shown my invention applied to a plug as commonly used upon locomotives it is of course to be understood that the invention is adaptable to other known types of plungers for forcing grease out of a cup, for automobile purposes, etc., such as a cap interiorly threaded to engage exterior threads of a cup. In this particular type by providing the under side of the top of the cap with a tooth or teeth and a projection or spreader, as heretofore shown and described, grease is forced from the cup by downward movement of the cap and the cap prevented from backing away from the grease on account of the grease being spread between the teeth as heretofore pointed out.

What I claim is:—

1. In combination, a grease cup having an outlet, a feed plug having adjustable engagement with said cup, a tooth on the bottom of the plug having a shoulder, and means carried by the plug and associated with the tooth for forcing the grease in the line of travel of the tooth upon downward movement of the plug.

2. In combination, a grease cup having an outlet, a feed plug having adjustable engagement with said cup, a tooth on the bottom of the plug having a shoulder, and means carried by the plug and associated with the tooth for forcing the grease against said shoulder upon downward movement of the plug.

3. In combination, a grease cup having an outlet, a feed plug having adjustable engagement with said cup, a tooth on the bottom of the plug provided with a shoulder, and means carried by the plug and associated with the tooth for forcing the grease in the line of travel of the tooth and against said shoulder upon downward movement of the plug.

4. In combination, a grease cup provided with an outlet, a feed plug having adjustable engagement therewith, teeth on the bottom of the plug each having a shoulder, and means associated with the teeth for forcing the grease within the line of travel of said teeth upon downward movement of the plug.

5. In combination, a grease cup provided with an outlet, a feed plug having adjustable engagement therewith, teeth on the bottom of the plug each having a shoulder, and means associated with the teeth for forcing the grease between said teeth and against said shoulders upon downward movement of the plug.

6. In combination, a grease cup having an outlet, a feed plug having adjustable engagement therewith, teeth on the edge of the bottom thereof each tooth provided with a shoulder, and a projection positioned on the bottom of the plug within the circumferential area of said teeth for forcing the grease between said teeth and against said shoulder upon downward movement of the plug.

7. In combination, a grease cup provided with an outlet, a feed plug having adjustable engagement with the cup, teeth on the bottom of the plug each tooth comprising a forwardly extended inclined portion adapted to ease into the grease upon forward rotation of said plug and each tooth having a rearward plane surface comprising a shoulder, and a substantially pointed projection positioned on the bottom of the plug within the circumferential area of said teeth for forcing the grease between said teeth and against said shoulders upon downward movement of the plug.

8. As an article of manufacture, a grease cup feed plug provided with a tooth on the bottom thereof having a shoulder and a projection located on the bottom of the plug in proximity to said tooth.

9. As an article of manufacture, a grease cup feed plug provided with teeth on the bottom thereof each having a shoulder and a projection located on the bottom of the plug within the circumferential area of said teeth.

10. As an article of manufacture, a grease cup feed plug provided with teeth on the bottom thereof each having a shoulder and a projection located on the bottom of the plug centrally of said teeth.

11. The method of preventing retrograde movement of grease cup feed plugs of the type having a tooth on the bottom thereof provided with a shoulder, which consists in causing the plug upon downward movement to act upon the grease in a manner to force the grease within the line of travel of said tooth.

12. The method of preventing retrograde movement of grease cup feed plugs of the type having teeth on the bottom thereof each having a shoulder, which consists in causing the plug upon downward movement to act upon the grease in a manner to force the grease between said teeth in the line of travel thereof and against said shoulders.

In testimony whereof I affix my signature.

CHARLES L. HOWARD.